Figure 1:
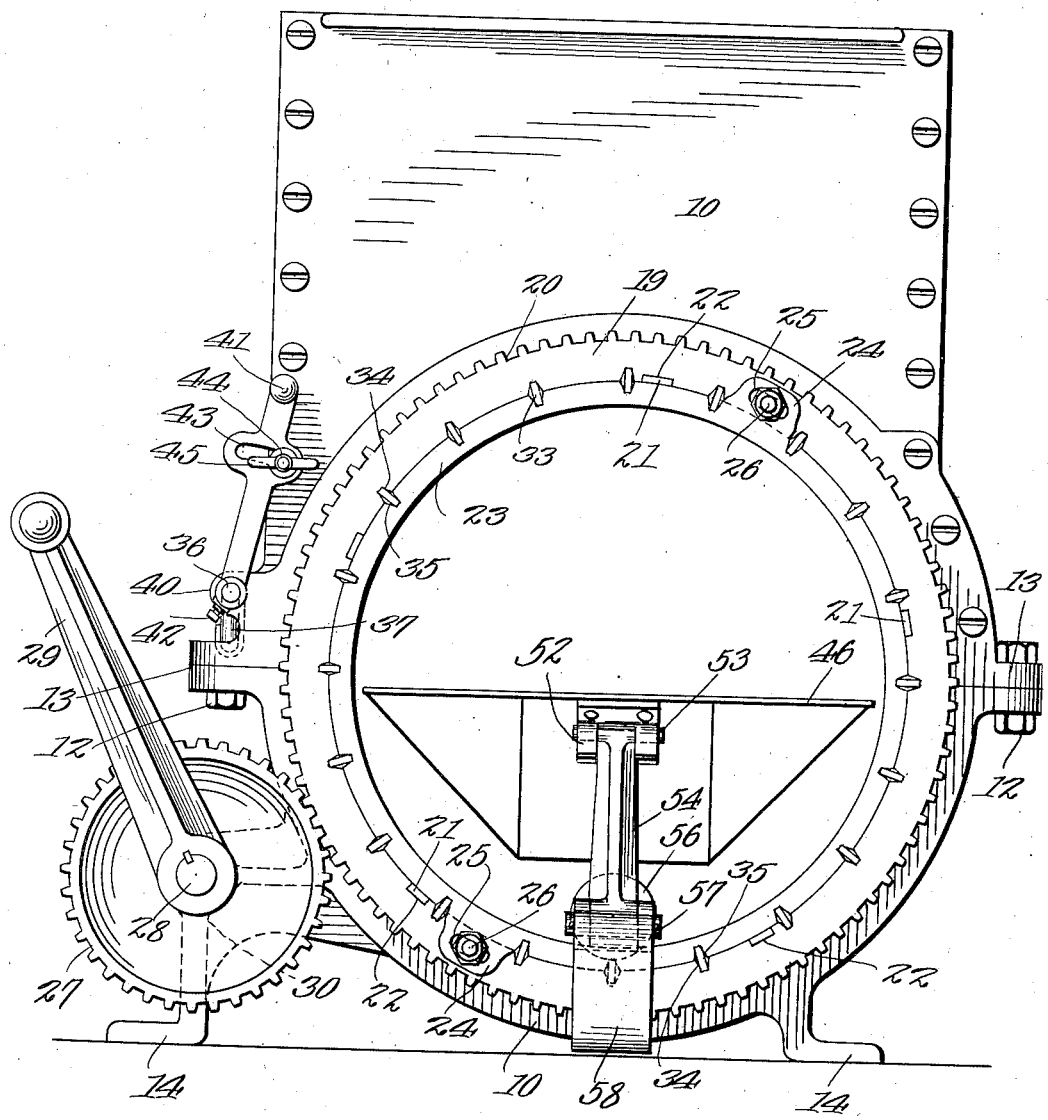

M. W. A. LADE.
VEGETABLE CUTTER.
APPLICATION FILED OCT. 15, 1913.

1,095,001.

Patented Apr. 28, 1914.
3 SHEETS—SHEET 1.

WITNESSES
M. J. Miller
H. L. Heidman

M. W. A. Lade
INVENTOR.
by Max A. Schmidt
Attorney

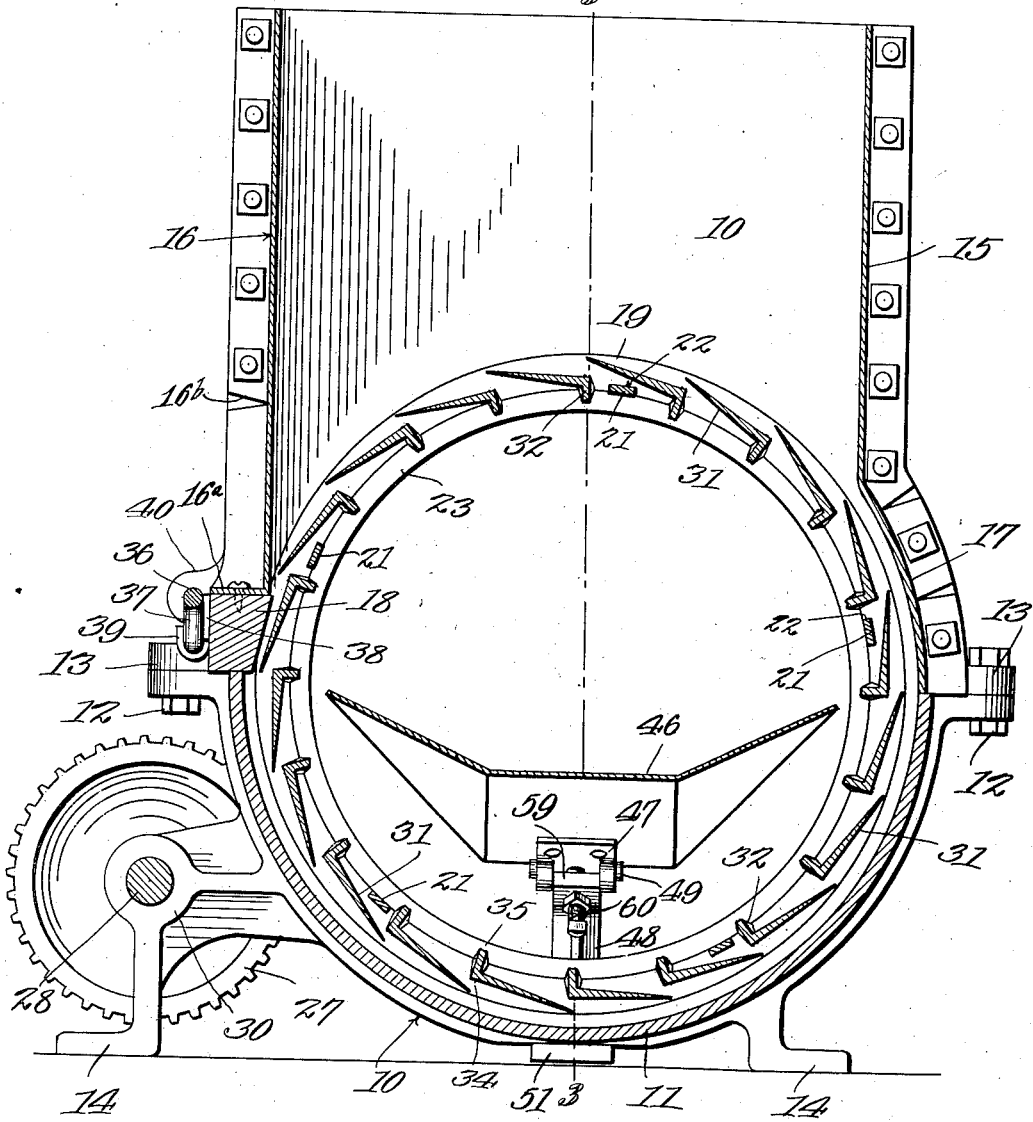

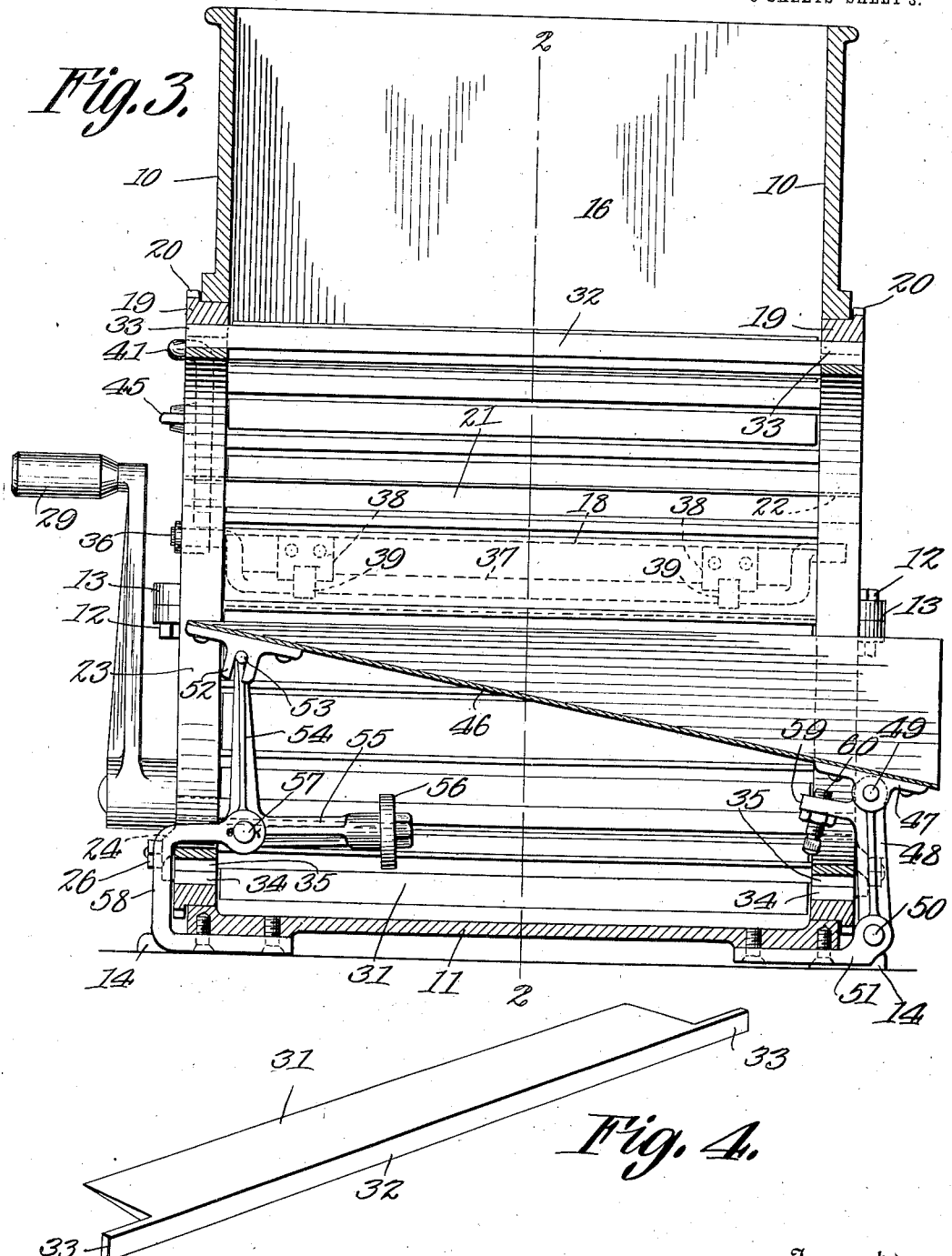

UNITED STATES PATENT OFFICE.

MARTIN W. A. LADE, OF PENDER, NEBRASKA.

VEGETABLE-CUTTER.

1,095,001.

Specification of Letters Patent.  Patented Apr. 28, 1914.

Application filed October 15, 1913. Serial No. 795,265.

*To all whom it may concern:*

Be it known that I, MARTIN W. A. LADE, a citizen of the United States, residing at Pender, in the county of Thurston and State of Nebraska, have invented certain new and useful Improvements in Vegetable-Cutters, of which the following is a specification.

This invention relates to that class of vegetable cutters which are employed for cutting vegetables, or cabbage for sauerkraut, slaw, etc., and its object is to provide an apparatus of this kind which is simple in construction, compact in form, and of large capacity.

With these and other objects in view, as will appear hereinafter, the invention consists in a novel combination and arrangement of parts to be described and claimed, reference being had to the accompanying drawings in which—

Figure 1 is an elevation of the apparatus. Fig. 2 is a cross-section on the line 2—2 of Fig. 3. Fig. 3 is a longitudinal section on the line 3—3 of Fig. 2. Fig. 4 is a perspective view of one of the knives.

Referring specifically to the drawings, the casing of the apparatus has spaced side walls 10 between the bottom portion of which extends a semi-circular wall 11 which forms a trough to hold the cut cabbage. The side walls are in separate top and bottom sections which are bolted together, as indicated at 12, the abutting ends of the sections having lugs 13 for this purpose. The bottom section has feet 14 for supporting the casing, said feet having perforations so that they may be bolted down on a table or other suitable support. Between the side walls, above the trough bottom 11, extend front and rear end walls 15 and 16, respectively, having flanged ends whereby they are bolted to the side walls. The lower portion of the wall 15 is curved, as indicated at 17, to form a continuation of the trough bottom 11, and above said curved portion, the wall is perpendicular and extends to the top of the side walls. The end wall 16 is perpendicular throughout its entire height and also extends to the top of the side walls. The lower end of the wall 16 is spaced from the rear edge of the trough bottom, to provide a space for a wooden cutter bar 18 which coöperates with the knives to be presently described.

In the side walls 10 are circular openings which are in alinement. In each of these openings is rotatably mounted a ring 19 projecting from the opening and having said projecting portion formed with spur-gear teeth 20. The rings are connected by cross-bars 21 seating and secured in recesses 22 in the inner periphery of the rings, whereby the rings are retained in the side wall openings.

Concentrically mounted inside the gear ring 19 is a second ring 23, the external diameter of which latter is the same as the internal diameter of the former, so that it fits snugly therein. The two rings are bolted together, the inner ring 23 having lugs 24 provided with arcuate slots 25 through which the bolts 26 pass. Both gear rings 19 carry the herein-described inner rings. The slots 25 permit relative rotary movement of the inner and outer rings before the bolts 26 are fastened by their nuts, which is for the purpose of adjusting the knives to be presently described.

A drive pinion 27 is provided for each gear ring 19, said pinions being carried by a shaft 28 equipped with a hand-crank 29 for operating the same. The shaft is supported in bearings 30 extending from the bottom sections of the side walls 10.

The gear rings 19 and the inner rings 23 carry the cutting knives of the apparatus, said knives extending in a circular series between the two sets of said rings. Each knife comprises a blade 31 of sufficient length to extend between the aforesaid sets of rings. The rear edge of the blade has a laterally extending flange 32 which is continued for a short distance beyond the ends of the blade to form attaching shanks 33. The inner edges of the rings 19 have radial notches 34 which register with similar notches 35 in the outer edges of the rings 23, and into these registering notches the shanks 33 are placed and held when the rings are fastened together by the bolts 26. The blades 31 extend tangentially and pass close to the face of the cutter bar 18, said face being beveled.

The cutter bar 18 is fastened to an outstanding flange 16ᵃ at the lower end of the wall 16, and the end flanges of said wall have V-shaped notches 16ᵇ in order that the wall may be bent to adjust the cutter bar, the end flanges being left loose below the notches. The adjustment of the cutter bar is effected by means of a rock shaft 36 having a crank portion 37 which is in contact with wear plates 38 secured to the back of the cutter bar, said wear plates having hook-shaped seats 39 for said crank portion of the shaft.

The shaft 36 is mounted in bearings 40 extending from the upper section of the side walls 10. A hand-lever 41 is provided for operating the shaft 36, said lever being made fast on the shaft by a set screw 42. At the grip portion of the lever is an arcuate slot 43, through which passes a bolt 44 provided with a wing nut 45, which latter, when tightened, locks the lever. The bolt is carried by the upper section of one of the side walls 10. Upon unlocking the hand-lever 41, and by means of the same rocking the shaft 36, it will be obvious that the cutter bar 18 may be advanced or retracted and thus adjusted relative to the knives 31.

It will be noted that the notches 34 and 35 are flared outward, their outer ends being wider than the thickness of the shanks 33 of the knives 31, in view of which the angle of the knives may be varied by rotating the rings 23 relative to the rings 19.

Within the circle described by the series of knives 31 is located a pan 46 having a sloping bottom, the slope being in the direction of one side of the machine, the lower end of the pan projecting a short distance from this side. The pan extends lengthwise through the space around which the knives revolve, and its sides extend to within a short distance of the inner periphery of the rings 23. The top of the pan is located a short distance below the level of the bottom of the cutter bar 18. The lower open end of the pan is designed to discharge into a suitable receiver. If any of the cuttings miss the pan, they are carried up again by the knives and then dropped into the pan. In order to facilitate the discharge of cuttings from the pan, a mechanism is provided for shaking the same, said mechanism comprising the following parts: To the bottom of the pan, at the lower end thereof, is fastened a support 47 for a rocker 48, said support having ears between which one end of the rocker is pivoted, as indicated at 49. The other end of the rocker is pivoted at 50 to a support 51 made fast to the bottom of the wall 11. To the bottom of the pan, at the upper end thereof, is fastened a fork-shaped saddle 52, between the branches of which latter loosely extend trunnions 53 at the extremity of one branch 54 of a bell-crank lever, the other branch of which lever carries a roller 56 positioned so that the knives 31 glide over the same when the apparatus is in operation. The bell-crank lever is supported, as indicated at 57, by a bracket 58 secured to the bottom of the wall 11, and having an overhanging part which extends over into the space inside the series of knives, in order to properly position the bell-crank lever and the roller carried thereby. The rocker 48 has a lateral arm 59 carrying a set screw 60 at its extremity. The arm is located beneath the pan, and the set screw is adapted to strike the bottom of the latter.

When the apparatus is in operation the knives 31, in gliding over the roller 56, oscillate the bell-crank lever, and by reason of the connection between the latter and the pan 46, said pan is shaken to prevent the cuttings from accumulating therein, and to facilitate their travel toward the discharge end of the pan. The screw 60 forms an abutment and when it strikes the bottom of the pan it raises the opposite end thereof slightly. The amount of vibration can be varied by adjusting the screw. The cabbages or other vegetables are thrown into the open top of the casing, and they are cut by the revolving knives 31, the latter being operated by means of the hand-crank 29 through the hereinbefore described gearing.

The apparatus is compact in form and occupies a minimum amount of space, it is rapid in operation, and it has a large capacity.

While the apparatus is designed primarily for cutting cabbage, it is not limited to such use, but it may be employed for cutting other vegetables. It is also to be understood that various changes and modifications in the structural details hereinbefore described and shown in the drawings may be made without departure from the spirit and scope of the invention as hereinafter claimed.

I claim:

1. A vegetable cutter comprising a casing having a flexible wall, a cutter working in the casing, a cutter board in the casing past which the cutter travels, said cutter board being carried by the aforesaid flexible wall, and means for bending said wall to adjust the cutter board relative to the cutter.

2. A vegetable cutter comprising a casing having a flexible wall, a cutter working in the casing, a cutter board in the casing past which the cutter travels, said cutter board being carried by the aforesaid flexible wall, a rock-shaft having a crank portion engageable with the back of the cutter bar, and means for operating the rock-shaft.

3. A vegetable cutter comprising a casing having circular side openings, gear rings mounted in said openings, a circular series of knives extending between the rings and fastened thereto, pinions in mesh with the gear rings, and means for operating the pinions.

4. A vegetable cutter comprising a casing, and a revolving cutter working therein, said cutter comprising a circular series of blades having attaching shanks at their ends, and a support for the blades, said support comprising concentric rings fitting one within the other and having their contiguous edges notched, the notches of the respective rings registering and receiving the aforesaid shanks, and means for fastening the rings together.

5. A vegetable cutter comprising a casing, and a revolving cutter working therein, said cutter comprising a circular series of blades having attaching shanks at their ends, and a support for the blades, said support comprising concentric rings fitting one within the other and having their contiguous edges notched, the notches of the respective rings registering and receiving the aforesaid shanks, and means for fastening the rings together, said rings being rotatably adjustable relative to each other.

6. A vegetable cutter comprising a casing, and a revolving cutter working therein, said cutter comprising a circular series of blades having attaching shanks at their ends, and a support for the blades, said support comprising concentric rings fitting one within the other and having their contiguous edges notched, the notches of the respective rings registering and receiving the aforesaid shanks, one of the rings having lugs provided with arcuate slots, and fastening means passing through said slots into the other ring.

7. A vegetable cutter comprising a casing, and a revolving cutter working therein, said cutter comprising a circular series of blades having attaching shanks at their ends, and a support for the blades, said support comprising concentric rings fitting one within the other and having their contiguous edges notched, the notches of the respective rings registering and receiving the aforesaid shanks, and means for fastening the rings together, said rings being rotatably adjustable relative to each other, and the notches being flared outward.

8. A vegetable cutter comprising a casing, a revoluble cutter working in the casing, said cutter having a circular series of blades, a cuttings-receiving pan located inside the circle described by the blades, rocking supports for the pan, and means for rocking the pan in the direction of its length.

9. A vegetable cutter comprising a casing, a revoluble cutter working in the casing, said cutter having a circular series of blades, a cuttings-receiving pan located inside the circle described by the blades, and rocking supports for the pan, one of said supports carrying a roller over which the cutter blades glide.

10. A vegetable cutter comprising a casing, a revoluble cutter working in the casing, said cutter having a circular series of blades, a cuttings-receiving pan located inside the circle described by the blades, and rocking supports for the pan, one of the supports being a bell-crank lever, and a roller carried by one of the branches of the bell-crank lever, over which roller the cutter blades glide.

11. A vegetable cutter comprising a casing, a revoluble cutter working in the casing, said cutter having a circular series of blades, a cuttings-receiving pan located inside the circle described by the blades, and rocking supports for the pan, one of said supports carrying a roller over which the cutter blades slide, and the other support having an abutment which is in the path of the bottom of the pan.

In testimony whereof I affix my signature in presence of two witnesses.

MARTIN W. A. LADE.

Witnesses:
G. J. ADAMS,
H. STERLING TAYLOR.